Nov. 1, 1938.  H. B. BATJER  2,135,025
BUTTER MOLD
Filed March 26, 1937  2 Sheets-Sheet 1
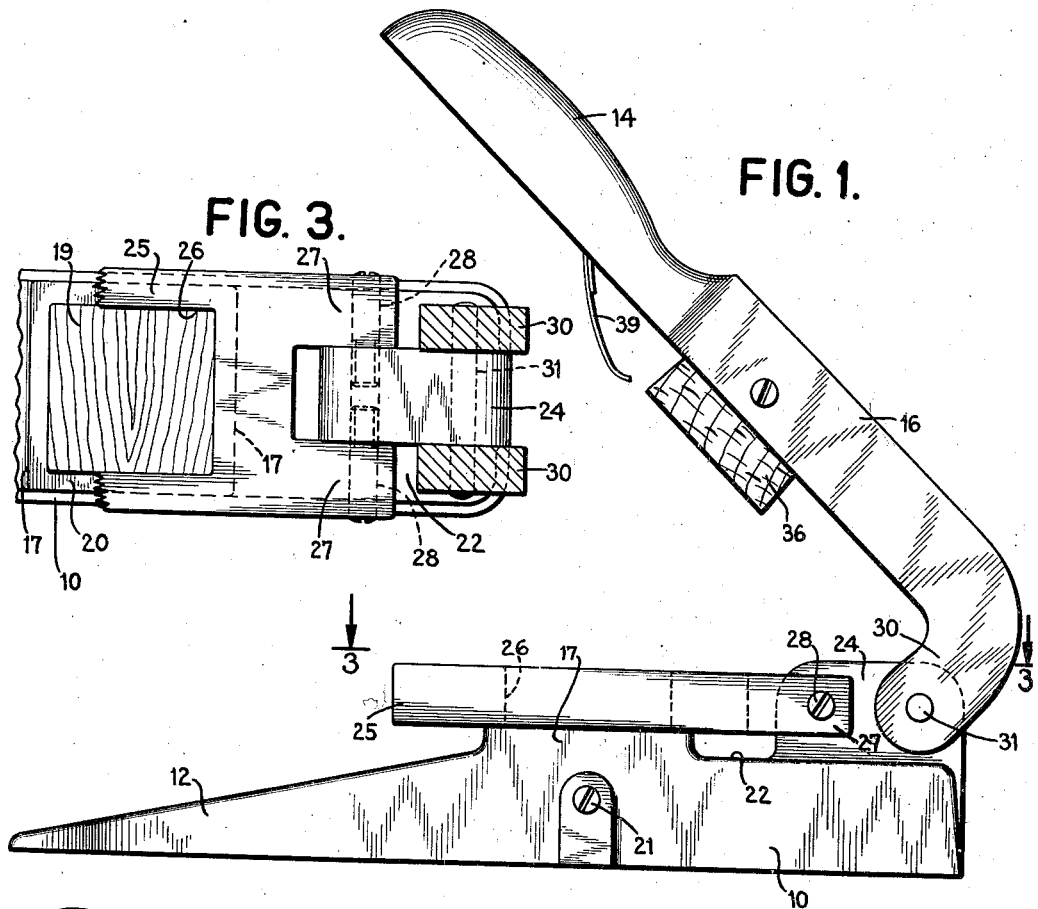
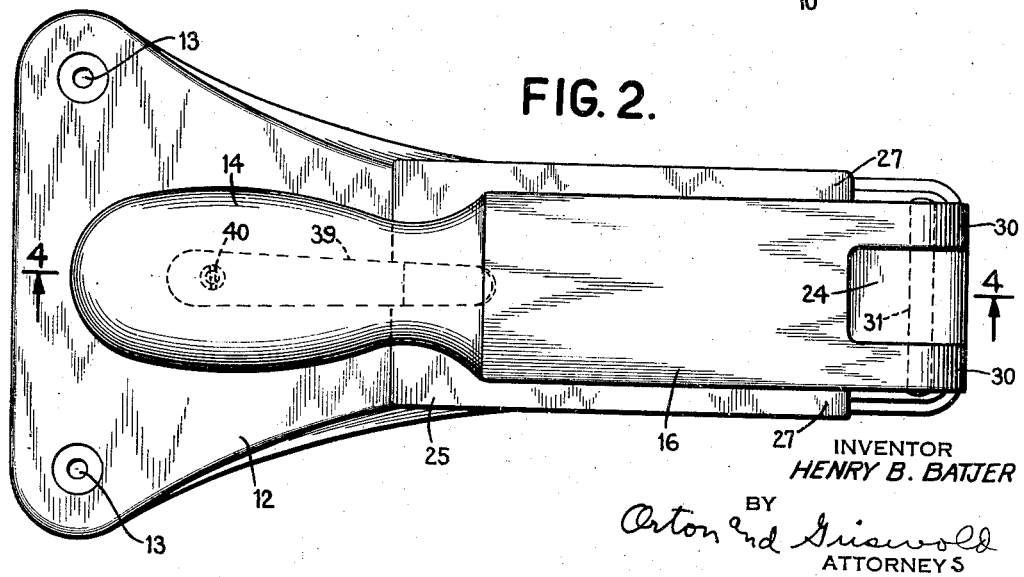
INVENTOR
HENRY B. BATJER
BY
Orton and Griswold
ATTORNEYS Nov. 1, 1938.   H. B. BATJER   2,135,025
BUTTER MOLD
Filed March 26, 1937   2 Sheets-Sheet 2
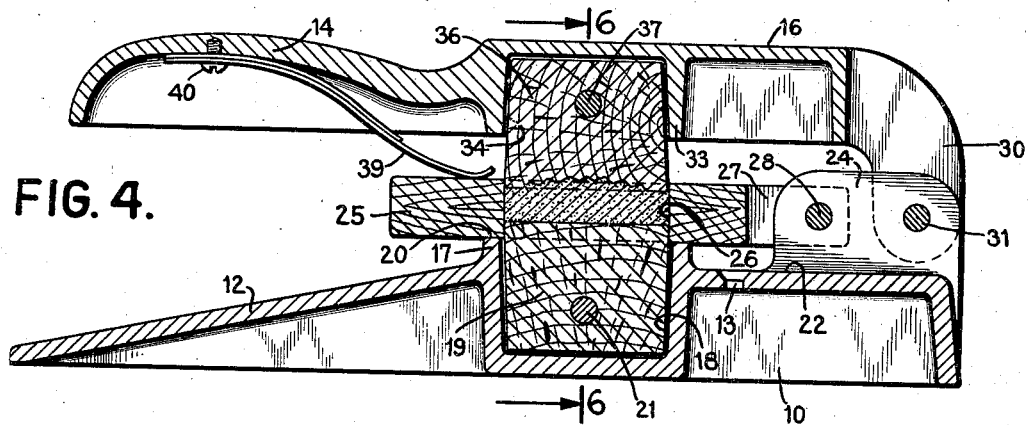
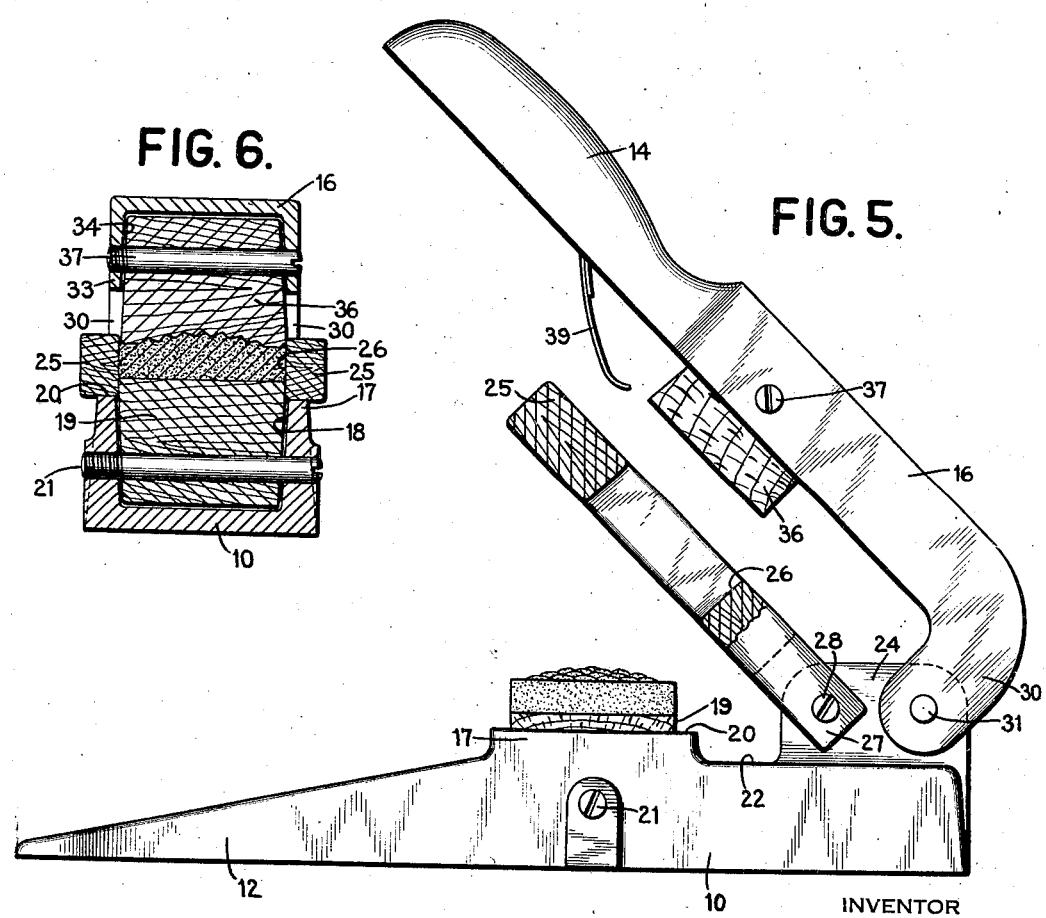
INVENTOR
HENRY B. BATJER
BY
Orton and Griswold
ATTORNEYS Patented Nov. 1, 1938

2,135,025

UNITED STATES PATENT OFFICE 2,135,025

BUTTER MOLD

Henry B. Batjer, Brooklyn, N. Y.

Application March 26, 1937, Serial No. 133,120

1 Claim. (Cl. 31—42)

This invention relates to devices adapted to emboss pats of butter and has particular reference to a device capable of use by the ordinary housewife.

One object of the present invention is a butter embossing device which is easily manipulated and of small size for convenient use in the home kitchen.

Another object of the invention is a device of the character described by which butter in readily available commercial sizes can be made use of.

Still another object of the invention is a butter pat embossing device having few and simple parts which can be readily cleaned and which is capable of storage in small space such as a table drawer.

It is also an object of the invention to provide a device which is mechanically simple and has few moving parts so as to be capable of use by the most inexperienced person.

The invention also seeks a butter pat embossing device which is practical from the standpoint of ease and cheapness of manufacture and assembly and convenience and durability in use.

These and other objects of the invention and the means for their attainment will be more apparent from the following detailed description, taken in connection with the accompanying drawings illustrating one embodiment by which the invention may be realized and in which:

Figure 1 is a view of the butter pat embossing device of this invention, in side elevation, with the parts in position to receive a pat of butter for embossing;

Figure 2 is a plan view of the device of Figure 1 looking from above;

Figure 3 is a fragmentary, transverse, sectional view, taken in the horizontal plane indicated by the line 3—3 of Figure 1, looking in the direction of the arrows and showing details of construction;

Figure 4 is a longitudinal vertical sectional view, taken in the plane indicated by the line 4—4 of Figure 2, looking in the direction of the arrows and showing a pat of butter embossed therein;

Figure 5 is a view similar to Figure 1 but showing the parts in separated position to permit the removal of the embossed pat of butter; and Figure 6 is a transverse, vertical sectional view taken in the plane indicated by the line 6—6 of Figure 4 and looking in the direction of the arrows.

While the device illustrated in the drawings is capable of embodiment in various forms, shapes and materials, it is illustrated as comprising a base member 10 of generally elongated shape, of greater length than width, and conveniently of metal, as a casting. To facilitate manipulation, the end 12 of the device is of gradually increasing width and of progressively decreasing height so that the handle 14 of the cooperating member 16 may be readily held in the hand without pinching the fingers when the parts are in closed or embossing position. The corners of this end may be conveniently formed with apertures 13 (Figure 2) to receive screws securing the device to a table top or the like.

Intermediate the ends of the base member 10 is an elevated portion 17, conveniently of substantially the width of the base member at this point, and, in the illustrated embodiment, substantially square in horizontal cross-section and is formed with a substantially square recess 18 of material depth to receive a butter pat supporting block 19, preferably of a hard wood such as maple. The block is held in place by a removable pin 21 so that it can be readily removed for cleaning.

The block extends slightly above the top surface 20 of the walls of the recess 18 and is designed to be of the same shape and area as the pat of butter to be embossed. In the illustrated embodiment, this area is rectangular for the reason that it is contemplated to emboss a pat of butter cut from the end of a block of butter of a size sold commercially. One pound blocks of butter are generally sold at retail and all are of substantially the same general dimensions. Moreover, these pound blocks are frequently divided up into quarters by cuts in vertical and horizontal planes so that elongated quarter pound blocks of butter are formed which are substantially square in cross section. In the main, the device of this invention will find its greatest applicability to the embossing of pats of butter of desired thickness cut from the end of such a quarter pound block of butter and for that reason the block 19 is of substantially the same size and shape as the cross sectional area of such a quarter pound block.

At the end remote from the end of reduced height, the upper surface 22 is illustrated as relatively flat in a plane below the plane 20 of the top surface of the raised portion 17. In any event, the surface 22 is below the surface 20 and rising therefrom is a lug or pivot member 24 which is conveniently a relatively thin, flat sided portion extending preferably in the longitudinal median line of the base 10 and, further, extends in an upward direction a sufficient distance to receive the pivot pins of cooperating members, next to be described.

It will be obvious that when pressure is applied to the upper surface of the pat of butter, which at that time is rectangular in all dimensions, that it is desirable, if not absolutely necessary, to retain the pat in the size and shape desired. To that end it is surrounded, during the embossing operation, by a frame member 25 which, since it comes in contact with the butter, is also conveniently although not necessarily made of a hard wood such as maple. In the illustrated embodiment, this frame member 25 is rectangular in shape and somewhat elongated and is formed intermediate its ends with an opening or passage 26 of a shape and size of the pat of butter, in this instance, square. The overall depth of the recess, that is the distance between the upper and lower surfaces of the member 25, is greater than the height of the pat of butter and is adapted to receive the upper portion of the block 19, as shown clearly in Figure 4. The one end of the member 25 is bifurcated and the arms or ends 27, forming the bifurcation, are disposed upon opposite sides of the boss 24 and are pivotally secured thereto by the pins 28 which are conveniently threaded into apertures in the lug 24 to permit ready removal for replacement or cleaning. To permit such ready removal, the heads of these pins 28 are shown as slotted to receive a screw driver or other instrument.

The cooperating clamping member 16 is also bifurcated at the end opposite to the handle 14. It, also, is conveniently a casting and the arms 30 forming the bifurcation are conveniently bent downwardly and provided with registering apertures whereby, when the arms straddle the lug 24, a pin 31, which may or may not be removable, may pivotally secure the upper embossing member to the lower one.

Intermediate its ends and in registering relation with the recess 18 of the lower member, is formed a similar recess 34 which likewise receives a block 36 adapted to cooperate with the block 19. Here again, the block is conveniently of wood, is hard, such as of maple, and is likewise removably secured in the recess 34 formed in the member 16 as by the removable locking pin 37 so that the block may be readily removed for replacement or cleaning. This block again extends below the wall 33 forming the recess 34 and is of such size and shape as to enter the recess 26 of the retaining member 25 and engage the upper surface of the pat of butter. The lower surface of the block is conveniently embossed, in reverse of course, with the configurations desired on the surface of the pat of butter.

The operation of the device will be apparent from the foregoing description. After the blocks 19 and 36 are secured in their respective recesses, the block 36 having the desired design to be embossed on the pat of butter and with the butter pat retaining member 25 resting on the surface 20, as illustrated in Figure 1, a rectangular pat of butter is placed within the recess 26 to rest upon the block 19 and be supported thereon and by the vertical walls of the recess 26. The upper member 16 is then moved downwardly so that the exposed end of the block 36 enters the recess 26 and is pressed against the top surface of the pat of butter to emboss the desired design therein.

The pat of butter by this operation is slightly distorted or pressed into contact with the walls of the recess 26 so that if the upper member 16 were moved upwardly for the purpose of removing the pat of butter, it would quite likely carry the retaining member 25 with it. To avoid this eventuality, a resilient or compressible means, illustrated as a leaf spring 39 of suitable resiliency, may be conveniently secured within the handle 14, as by the screw 40. The leaf spring 39 is normally so shaped that when the parts are in closed position, as illustrated in Figure 4, the leaf spring engages, and is flexed in so engaging, by the retaining member 25. Thus, when the handle 14 is raised, the action of the leaf spring 39 maintains the retaining member 25 in contact with the surface 20 of the base member and permits the removal of the block 36 without disturbing the relation of the pat of butter and its retaining member. Of course, after the parts are separated to this extent, the top member 16 may be moved completely away from the pat of butter to permit its removal without disturbing the position thereof. Then, of course, the retaining member 25 may be raised and the pat of butter will either remain on the block 19 or, if within the recess 26, may be readily pushed out of the recess and the parts rearranged for the reception of a second pat of butter.

It will thus be seen that a butter pat embossing device has been provided in which the coacting members are readily disassembled for cleaning or replacement and that the metal parts thereof may be readily formed as by molding, stamping or otherwise from any material.

Various modifications will occur to those skilled in the art in the configuration, composition and disposition of the component elements going to make up the invention as a whole as well as in the selection and/or replacement of parts thereof by others performing substantially the same or a related function, and no limitation is intended by the phraseology of the foregoing description or illustrations in the accompanying drawings, except as indicated in the appended claim.

What I claim is:

A butter pat embossing and molding machine comprising a base member formed intermediate its ends with a recess, a butter pat supporting block in the recess, a central pat positioning member hinged to the base member, said central member being formed with a passage in register with the recess in the base member and of a size to receive the upper edge of the supporting block, an upper cooperating member hinged to the base member and formed in its lower surface intermediate its ends with a recess and an embossing block in the recess in said cooperating member projecting below the surface of the cooperating member to enter the passage in the butter pat positioning member, a handle on said upper cooperating member, a leaf spring secured to said handle and projecting therefrom and adapted in one position of the handle relative to the central pat positioning member to hold said central pat positioning member against the base member whereby during initial movement of the upper cooperating member away from the central pat positioning member the spring is momentarily retained in contact with the central pat positioning member.

HENRY B. BATJER.